Figure 1:
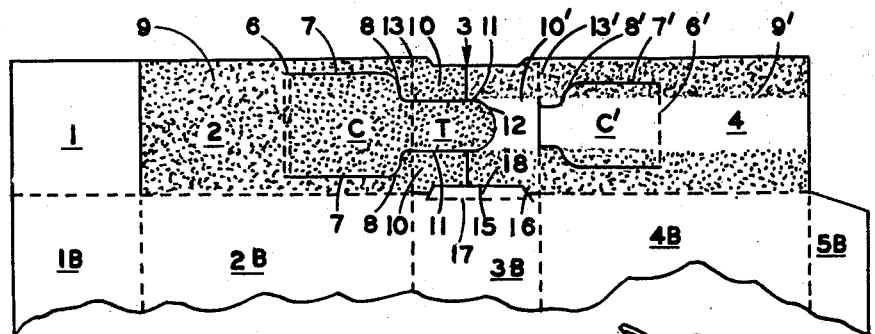

July 9, 1963 — P. J. GRAYBILL — 3,096,922

DISPENSING CONTAINERS

Filed Dec. 6, 1960

INVENTOR
Paul J. Graybill

United States Patent Office 3,096,922
Patented July 9, 1963

3,096,922
DISPENSING CONTAINERS
Paul J. Graybill, Sunset Hill Drive, Pine Orchard, Conn.
Filed Dec. 6, 1960, Ser. No. 74,041
8 Claims. (Cl. 229—17)

The present invention relates to dispensing containers in general and to dispensing containers having opening and reclosing means inherent in the glue end thereof, in particular.

This invention is an improvement and variation on the applicants invention Number 2,812,127. The improvement relates to the formation of the tuck-tab from the Van Buren Ear and the inclusion of the tuck-slot, this formed by the use of two superimposed Van Buren Ears.

Broad Objective

The broad objective of my invention is to provide a one-piece container having inherent dispensing means in one of the multiple layered end walls thereof, said dispensing means consisting of an aperture in said multiple wall, formed by the displacement of a multiple layered hingedly joined cover, together with the cover itself, said cover being cut releasably free on three sides thereof from the various layers of the multiple layered end wall and hingedly jointed on the fourth side. In one position, said cover being an intgeral part of said end wall, in another position said cover being torn free from said wall and rotated about on said hinged connection thus opening said aperture, and still in a third position said cover being reclosed with an appended tuck-tab tucked into a tuck-slot situated between the innermost Van Buren Ear and the container side wall, said slot being formed by a glue free area between said Van Buren Ear and said container side wall, said tuck-tab thus being securely held, preventing accidental opening, said tuck-tab protruding through the tuck-slot sufficiently also to act as a push out means in reopening said cover.

This structure is especially advantageous and desirable for several reasons, (1) it is easily opened, (2) it is easily reclosed, (3) it is easily reopened, (4) it does not require any special machinery in the original forming of the container or in the filling thereof, (5) it does not require additional stock, (6) it forms a very efficient reclosure, (7) it can be used for a wide variety of products, (8) it allows easy access to the products therein and finally (9) it affords convenient dispensing of these products.

This container is a decided advance over the container covered in the previously mentioned patent in that it affords a secure tuck-in as well as a positive push-out in securing and reopening the cover. It is also a decided advance over other known containers and fills a need in the packaging of many products since it does not require additional stock or the addition of metal parts in its formation.

This container thus in various sizes and arrangements is unusually well adapted for any and all fast pouring granular, seed or powdered products where controlled dispensing is advantageous and a reclosure is dequired or desired.

Specific Objectives

The more specific objectives of my invention are as follows:

(1) To provide a one piece glue-end container having inherent opening, closing, reclosing and securing means in one of the multiple end walls thereof, said means consisting of an aperture, a multiple course cover thereof, a tuck-tab and a tuck-slot, said tuck-tab and tuck-slot being the means of securing said cover in its closed position, said cover having staggered edges to provide a secure closure thereof.

(2) To provide such a container in which said cover is cut releasably free on three sides thereof from said multiple paneled wall, and is articulated by a hinged connection on the fourth side thereof providing free rotation of said cover.

(3) To provide such a container having two Van Buren Ears superimposed one on the other, on one side of the dispensing end of said container, said outer Van Buren Ear being modified by two cuts to form a tuck-tab, said inner Van Buren Ear being adhered to said side wall of said container only along the opposing margins thus providing a central glue free area forming a tuck-slot through which said tuck-tab may be pushed.

(4) To provide such a container in which said tuck-tab is articulated by hinged connection to the free end of said cover.

(5) To provide such a container in which said tuck-tab when tucked into said tuck-slot acts as a securing means to hold said cover in a closed position.

(6) To provide such a container in which said tuck-tab is sufficiently long to protrude beyond said Van Buren Ear to provide a finger grip to facilitate the initial opening of said cover, as well also to facilitate the reopening of said cover by serving as a push-tab when said tuck-tab is protruding through said tuck-slot.

(7) To provide in one modification, a container having a portion of the side wall of said container adjacent to said aperture slanted inwardly to form a small V trough to facilitate the insertion of said tuck-tab into said tuck-slot.

Designations of Illustrations

Figure 2:
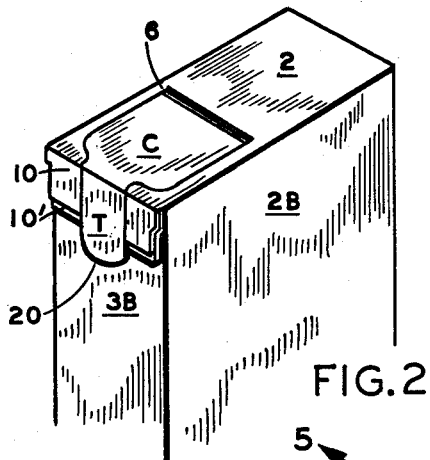
Figure 3:
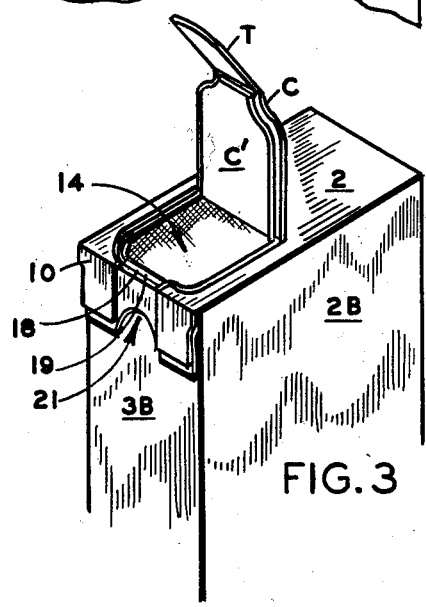
Figure 4:
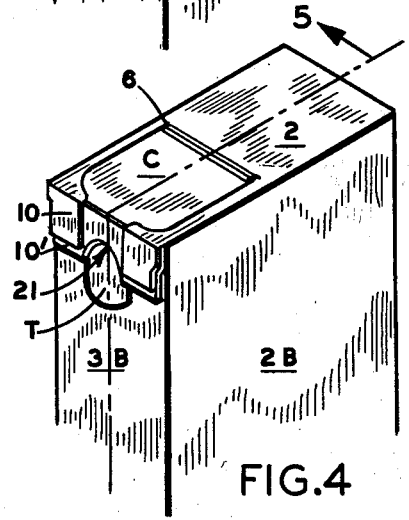
Figure 5:
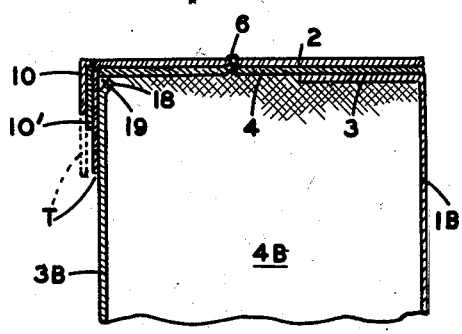

These and other objectives and advantages will become apparent as the following detailed description proceeds, when reference is made to the accompanying drawings, in which certain modes of carrying out the present invention are shown for illustrative purposes:

FIG. 1 is a view of the inside of a portion of the blank of the container showing the cuts, creases and the glue areas necessary to form the dispensing means of said container, FIG. 2 is an isometric view of a portion of the container in a preopened condition, showing especially well the protruding tuck-tab in position to be grasped and torn free in the initial opening, FIG. 3 is likewise an isometric view of a portion of the container in an opened condition showing especially well the staggered edges of the cover, the V shaped trough at the tuck-slot and the tuck-tab, FIG. 4 is also an isometric view of a portion of the container in a reclosed condition showing the positioning of the tuck-tab in the tuck-slot protruding though sufficiently to act as a push-tab to facilitate the reopening of the container, FIG. 5 is a cross sectional view of the container as indicated in FIG. 4 showing the position of the tuck-tab between the inner Van Buren Ear and the container side wall. Also shown in dots is the initial position of the tuck-tab.

Description and Manufacturing Procedure

Referring then to the drawings, in which the same or similar parts in the several drawings are indicated by the same number for ease in identification, FIG. 1 is a view of a portion of the inside surface of the blank showing container walls 1B, 2B, 3B and 4B, and the side glue-flap 5B which are articulated to each other in the usual way to form a four walled container having as shown in FIG. 1 the usual glue-flaps 1, 2, 3, 4 articulated thereto, three of these, 2, 3 and 4 being modified to form the various members of the novel dispensing means claimed herein. No alteration is made in glue-flap 1. Glue-flap 2, which forms the outer course of the glue-end of the container, is modified by having releasable lateral cuts 7 ending in releasable curved cuts 8 so positioned to form the edges of the outer layer of cover C. Also one or more creases 6 join the terminals of cuts 7 to form the hinged articulation of the cover C to glue-flap 2. The entire outer surface of glue-flap 2 has glue applied as is indicated by the shaded area 9 when the container is to be formed. The stock which would normally form glue-flap 3 is greatly modified, in fact to the extent that there is really no glue-flap 3 but rather two Van Buren Ears 10 and $10^1$ and a tuck-tab T. Said tuck-tab T is formed by two lateral cuts 11 which are the continuation of curved cuts 8 in glue-flap 2 and extend completely across Van Buren Ear 10 into Van Buren Ear $10^1$ where they converge in curve 12 and become continuous thus completely forming tuck-tab T. Said tuck-tab T is articulated to cover C by a hinged connection crease 13 as also is Van Buren Ear 10. Crease 13 is positioned to coincide with the edge of container wall 3 when the container is formed and the glue-flaps brought into position. Van Buren Ear 10 and tuck-tab T have adhesive applied throughout when the container is formed. As stated Van Buren Ear $10^1$ is formed from the material of glue-flap 3 also. This ear is somewhat longer than Van Buren Ear 10 and is articulated to glue-flap 4 by crease $13^1$. Glue-flap 4 forms the second course of the glue-end of the container as glue-flap 1 forms a partial third layer thereof. Glue-flap 4 is modified as is glue-flap 2 by the formation of the inner layer of cover $C^1$. Straight cuts $7^1$, curved cuts $8^1$ and crease $6^1$ are required. $C^1$ is narrower than C to form staggered edges about the aperture 14 as shown in FIG. 3. Glue-flap 4 and Van Buren Ear $10^1$ have adhesive applied only along the lateral edges as shown by shaded area $9^1$. The blank of FIG. 1 may be further modified at glue-flap 3 by cut 15 short angle cuts 16 and offset crease 17, these positioned to form an angular flap 18 as shown in FIG. 3. Said angular flap 18 forms a V trough 19 when the container is set up for filling. When this angular panel is not desired cut would extend fully across glue-flap 3 at its juncture with side wall 3B and offset crease 17 would not be used. (This arrangement is not shown.)

These creases and cuts form the dispensing, opening and reclosing means for said container when said glue-flaps are superimposed and adhered in the normal way. These dispensing means consist of aperture 14, cover C, tuck-tab T, Van Buren Ears 10 and $10^1$ and V trough 19.

The blank of FIG. 1 is formed in the usual way by steel rule die cutting, the blank is then run through a straight line gluer and glue-flap 5B is adhered to container wall 1B ready for the filling operation.

The container blank is then set up on the filling machine; the only prerequisite is the Van Buren Ear attachment. The filling machine applies adhesive fully on glue-flap 2 and by a split glue wheel on glue-flap 4 as indicated. Glue-flap 1 is then rotated inwardly with glue-flap 4 being superimposed thereon and finally glue-flap 2 is brought about becoming the outside panel of the glue-end of the container. Van Buren Ears 10 and $10^1$ are brought about and adhered to the side wall 3B of the container completing the gluing operation and forming the dispensing means as shown in FIG. 2, thus completing one end of the container. The container is then filled and the other end closed in the usual manner. When the container is to be opened tuck-tab T, which protrudes slightly beyond Van Buren Ear 10 and forms a finger grip portion 20, is grasped and torn free from said Van Buren Ear 10 and $10^1$. Cover C and its adhered counterpart $C^1$ is then also torn free from glue-flap 2 and 4, cover C is rotated about at crease 6 opening the container as shown in FIG. 3 ready for dispensing the contained product.

When cover C is to be reclosed it is rotated forward about crease 6, tuck-tab T is brought forward also at essentially 90° in reference to cover C and is inserted in V trough 19 and subsequently through tuck-slot 21, bringing cover C into contact position closing aperture 14 FIG. 4. Tuck-tab T is securely held in tuck-slot 21 assuring a complete reclosure. The staggered edges of cover C, $C^1$ add to the effectiveness of the closure and prevent sifting. When cover C is to be reopened tuck-tab T can be used as a push-tab from below thus releasing cover C sufficiently to be opened from above.

FIG. 5 illustrates precisely the two positions of tuck-tab T. It is shown after reclosure of cover C in its normal tucked in position as in FIG. 4 and in dots it is shown in its initial preopened position as in FIG. 2. FIG. 5 also illustrates the positioning of angle panel 18 and the V trough 19 when it is used. If this feature is not desired side wall 3B is vertical all the way to glue-flap 4 (not shown).

Summary and Novelty

It should be noted at this point how the novelty of this construction affords several beneficial results. (1) The container as described is formed from a standard full glue-end blank. The only changes are minor alterations in the steel-rule cutting die; no additional stock or other appendage is necessary. (2) The blank is glued in a standard straight line gluer. (3) The container is set up and filled on any standard filling machine which forms containers having Van Buren Ears. The only alteration is a split glue wheel on one of the side glue-flaps. (4) The container affords a very effective closure. (5) The container can be easily opened by grasping the tuck-tab with the fingers; no special instrument is necessary. (6) The container affords ready access to and dispensing of the contained products. (7) The container is readily and securely reclosed by tucking the tuck-tab into the tuck-slot, accidental opening being thus prevented. (8) The container is readily and easily reopened by pushing the tuck-tab up from below sufficiently to lift the cover to a position where it can be easily grasped and fully opened.

The container then in its essential form affords a very efficient and economical package for a great number of foods and other products which require an efficient closure and a handy dispensing and reclosing means, this without the cost of special machinery or additional stock, or additional appendages such as metal spouts. The container is a decided advance in packaging, meeting an urgent need in the reclosure field.

It is understood then that the embodiment shown is only an example and various changes in shape, size or arrangements of parts may be resorted to without departing from the spirit of my invention or the scope of the sub-joined claims.

I claim:

1. A dispensing container formed of foldable stock having opening, reclosing and securing means inherent in a multiple wall thereof, said multiple wall being formed by the adhered container end glue-flaps thereof, said means consisting of a dispensing aperture, a hingedly joined multiple layered and staggered edged cover, a tuck-tab hingedly joined to the free end of said cover and a tuck-slot situated externally to the container wall, adjacent to said aperture into which said tuck-slot said tuck-tab can be inserted and there held when said dispensing aperture is reclosed by said hinged cover, said container having a Van Buren Ear articulated to each of the two end glue-flaps of said container, said ears being adhered on their lateral vertical edges in superimposed position to one another and to the end sidewall of said container adjacent to said dispensing aperture, said outer Van Buren Ear being modified by two vertical and releasable cuts which cuts form said tuck-tab, said inner Van Buren Ear having the vertical lateral edges adhered to said container sidewall, thus having a generally central glue free area which area constitutes said tuck-slot into which said tuck-tab is inserted when said aperture is reclosed.

2. A dispensing container formed of foldable stock having opening, reclosing and securing means inherent in a multiple wall thereof, said multiple wall being formed by the adhered container end glue-flaps thereof, said means consisting of a dispensing aperture, a hingedly joined multiple layered and staggered edged cover, a tuck-tab hingedly joined to the free end of said cover and a tuck-slot situated externally to the container wall, adjacent to said aperture into which said tuck-slot said tuck-tab can be inserted and there held when said dispensing aperture is reclosed by said hinged cover, said container having a Van Buren Ear articulated to each of the two end glue-flaps of said container, said ears being adhered on their lateral vertical edges in superimposed position to one another and to the end sidewall of said container adjacent to said dispensing aperture, said outer Van Buren Ear being modified by two vertical and releasable cuts which cuts form said tuck-tab, said inner Van Buren Ear having the vertical lateral edges adhered to said container sidewall, thus having a generally central glue free area which area constitutes said tuck-slot into which said tuck-tab is inserted when said aperture is reclosed, said multiple layered staggered edged cover being cut releasably free from the multiple wall of said container said cover in one position being in the same plane therewith closing said aperture and in another position being torn free therefrom and rotated about on its hinged connection forming and opening said aperture, said cover having articulated to its free edge a tuck-tab.

3. A dispensing container formed of foldable stock having opening, reclosing and securing means inherent in a multiple wall thereof, said multiple wall being formed by the adhered container end glue-flaps thereof, said means consisting of a dispensing aperture, a hingedly joined multiple layered and staggered edged cover, a tuck-tab hingedly joined to the free end of said cover and a tuck-slot situated externally to the container wall, adjacent to said aperture into which said tuck-slot said tuck-tab can be inserted and there held when said dispensing aperture is reclosed by said hinged cover, said container having a Van Buren Ear articulated to each of the two end glue-flaps of said container, said ears being adhered on their lateral vertical edges in superimposed position to one another and to the end sidewall of said container adjacent to said dispensing aperture, said outer Van Buren Ear being modified by two vertical and releasable cuts which cuts form said tuck-tab, said inner Van Buren Ear having the vertical lateral edges adhered to said container sidewall, thus having a generally central glue free area which area constitutes said tuck-slot into which said tuck-tab is inserted when said aperture is reclosed, said multiple layered staggered edged cover being cut releasably free from the multiple wall of said container said cover in one position being in the same plane therewith closing said aperture and in another position being torn free therefrom and rotated about on its hinged connection forming and opening said aperture said cover having articulated to its free edge a tuck-tab, said tuck-slot being formed by the partially adhered innermost Van Buren Ear and the container sidewall, said tuck-slot being ostensibly the glue free area between the vertical lateral glue areas on said ear in one condition being occupied by said tuck-tab when said aperture is reclosed.

4. The container of claim 3 in which said hingedly joined tuck-tab in one position being cut releasably free from and lying in the same plane with said outer Van Buren Ear and in another position being torn free from said outer Van Buren Ear and rotated about with said cover, when said container is in an open position, said tuck-tab in still a third position being rotated about its hinged connection to essentially 90° to said cover and inserted into said tuck-slot securely holding said cover in its closed position.

5. The container of claim 4 in which said tuck-tab is of sufficient length to protrude through said tuck-slot sufficiently to be used as a push-up means to at least partially open said cover.

6. A dispensing container formed of foldable stock having opening, dispensing, reclosing and securing means inherent in a multiple wall and two adjacent, articulated, and superimposed Van Buren Ears thereon, said multiple wall being formed by the superimposed and adhered glue-flaps of said container end, said opening and reclosing means consisting of a dispensing aperture in said multiple wall, a cover hingedly joined on one end thereof to said multiple wall, a tuck-tab hingedly joined to the free end of said cover, and an external tuck-slot positioned adjacent to said aperture on the outside wall of said container, said tuck-slot and said tuck-tab being inherent in and formed from said Van Buren Ears, said ears being articulated on one edge thereof to said glue flaps of said container, said inner Van Buren Ear being at least partially adhered to said container side-wall, said outer Van Buren Ear being at least partially adhered to said inner Van Buren Ear.

7. A dispensing container formed of foldable stock having opening, dispensing, reclosing and securing means inherent in a multiple wall and two adjacent, articulated, and superimposed Van Buren Ears thereon, said multiple wall being formed by the superimposed and adhered glue-flaps of said container end, said opening and reclosing means consisting of a dispensing aperture in said multiple wall, a multiple layered and staggered edged cover hingedly joined on one end thereof to said multiple wall, a tuck-tab hingedly joined to the free end of said cover, and an external tuck-slot positioned adjacent to said aperture on the outside wall of said container, said tuck-slot and said tuck-tab being inherent in and formed from said Van Buren Ears, said ears being articulated on one edge thereof to said glue flaps of said container, said inner Van Buren Ear being at least partially adhered to said container side-wall, said outer Van Buren Ear being at least partially adhered to said inner Van Buren Ear.

8. A dispensing container formed of foldable stock having opening, dispensing, reclosing and securing means inherent in a multiple wall and two adjacent, articulated, and superimposed Van Buren Ears thereon, said multiple wall being formed by the superimposed and adhered glue-flaps of said container end, said opening and reclosing means consisting of a dispensing aperture in said multiple wall, a cover hingedly joined on one end thereof to said multiple wall, a tuck-tab hingedly joined to the free end of said cover, and an external tuck slot positioned adjacent to said aperture on the outside wall of said container, said tuck-slot and said tuck-tab being inherent in and formed from said at least partial Van Buren Ears, said ears being articulated on one edge thereof to said glue flaps of said container, said inner Van Buren Ear being at least partially adhered to said container side-wall, said outer Van Buren Ear being at least partially adhered to said inner Van Buren Ear.

References Cited in the file of this patent

UNITED STATES PATENTS

| | | |
|---|---|---|
| 1,523,039 | Reed | Jan. 13, 1925 |
| 2,336,706 | Sunderhauf | Dec. 14, 1943 |
| 2,417,550 | Guyer | Mar. 18, 1947 |
| 2,812,126 | Graybill | Nov. 5, 1957 |
| 2,812,127 | Graybill | Nov. 5, 1957 |